United States Patent
Führer et al.

(10) Patent No.: US 7,152,934 B2
(45) Date of Patent: Dec. 26, 2006

(54) CO-ORDINATION METHOD FOR A REGENERATIVE AND ANTI-SKID BRAKING SYSTEM

(75) Inventors: Jochen Führer, Darmstadt (DE); Gregor Schmitt, Frankfurt (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 10/502,428

(22) PCT Filed: Feb. 3, 2003

(86) PCT No.: PCT/EP03/01036

§ 371 (c)(1),
(2), (4) Date: Jul. 23, 2004

(87) PCT Pub. No.: WO03/066398

PCT Pub. Date: Aug. 14, 2003

(65) Prior Publication Data

US 2005/0127750 A1    Jun. 16, 2005

(30) Foreign Application Priority Data

Feb. 5, 2002    (DE) ................................ 102 04 723

(51) Int. Cl.
*B60T 8/64* (2006.01)
(52) U.S. Cl. .......................................... 303/152; 303/3
(58) Field of Classification Search ................ 303/152, 303/20, 3, 191; 180/165, 197; 188/156, 188/158; 701/22, 70, 71; 318/376, 371, 318/372
See application file for complete search history.

(56) References Cited

U.S. PATENT DOCUMENTS

| | | | | |
|---|---|---|---|---|
| 5,450,324 A | * | 9/1995 | Cikanek ..................... 701/108 |
| 5,472,264 A | * | 12/1995 | Klein et al. ..................... 303/3 |
| 5,615,933 A | * | 4/1997 | Kidston et al. ............. 303/152 |
| 5,618,084 A | * | 4/1997 | Reiner ........................... 303/3 |
| 5,632,534 A | * | 5/1997 | Knechtges .................. 303/152 |
| 5,915,801 A | | 6/1999 | Taga et al. |
| 6,179,395 B1 | * | 1/2001 | Schneider ................... 303/152 |

(Continued)

FOREIGN PATENT DOCUMENTS

DE        23 22 446 B2    12/1973

(Continued)

OTHER PUBLICATIONS

German Search Report of Application No. 102 04 723.5 dated Oct. 9, 2002.

(Continued)

*Primary Examiner*—Thomas Williams
(74) *Attorney, Agent, or Firm*—RatnerPrestia

(57) ABSTRACT

In a method, which is intended for a motor vehicle with a regenerative and an anti-lock conventional brake system (ABS) and is used for coordinating the application of the regenerative and the anti-lock system, the regenerative brake system is switched off upon entry into an ABS control, however, upon termination of the ABS control or ABS control phase, regenerative braking is admitted again in dependence on the respective driving situation and/or criteria representative of the brake demand and the instantaneous coefficient of friction, in a modified form as compared to the regenerative braking operation prior to the entry into the ABS control mode.

11 Claims, 1 Drawing Sheet

U.S. PATENT DOCUMENTS

Figure 1:
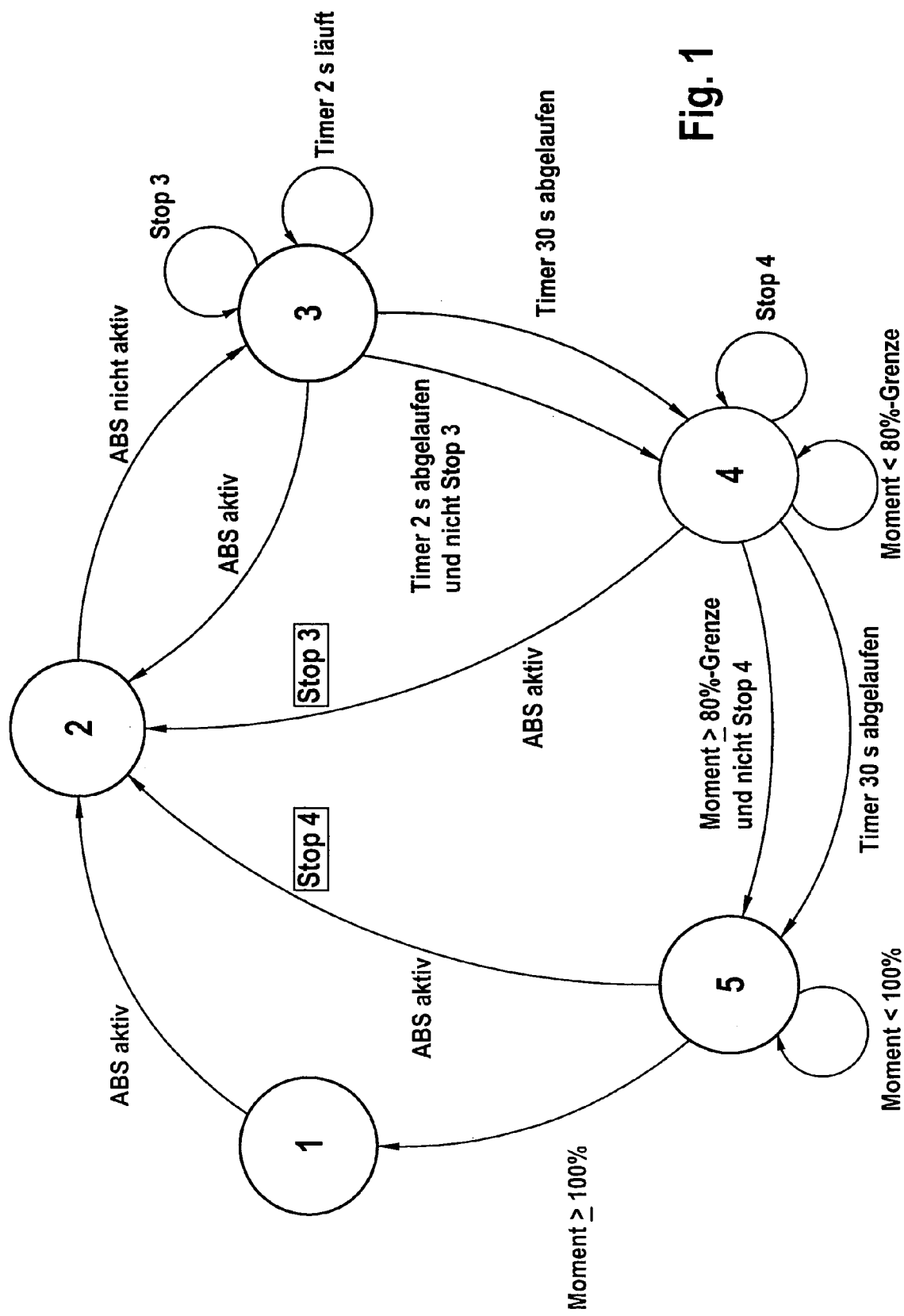

| | | | |
|---|---|---|---|
| 6,231,134 B1 * | 5/2001 | Fukasawa et al. | 303/152 |
| 6,488,344 B1 * | 12/2002 | Huls et al. | 303/152 |
| 6,687,593 B1 * | 2/2004 | Crombez et al. | 701/71 |
| 6,709,075 B1 * | 3/2004 | Crombez et al. | 303/152 |
| 2003/0062770 A1 * | 4/2003 | Sasaki et al. | 303/152 |
| 2006/0055239 A1 * | 3/2006 | Crombez et al. | 303/152 |

FOREIGN PATENT DOCUMENTS

| | | |
|---|---|---|
| DE | 41 24 496 A1 | 1/1993 |
| DE | 44 35 953 A1 | 5/1995 |
| DE | 44 43 814 C1 | 2/1996 |
| DE | 195 28 628 A1 | 2/1997 |
| DE | 198 42 472 A1 | 3/1999 |
| DE | 199 12 425 A1 | 7/2000 |
| DE | 010204723 A1 * | 8/2003 |
| EP | 0 715 999 A1 | 6/1996 |
| JP | 09037407 A * | 2/1997 |

OTHER PUBLICATIONS

International Search Report of Application No. PCT/EP03/01036 dated Apr. 10, 2003.

* cited by examiner

CO-ORDINATION METHOD FOR A REGENERATIVE AND ANTI-SKID BRAKING SYSTEM

TECHNICAL FIELD

The present invention relates to a method for a motor vehicle with a regenerative and an anti-lock conventional brake system (ABS) for coordinating the application of the regenerative and the anti-lock system, wherein the regenerative brake system is switched off upon entry into an ABS control.

BACKGROUND OF THE INVENTION

In vehicles with a regenerative brake (electric and hybrid vehicles), a major part of the braking power or the total braking power is generated by the electric drive when working on generator in the partial braking range, and the recuperated energy is fed back into the battery. To achieve a high efficiency, the total braking power is generated by the generator, and thus applied only to the driven axle. On a low coefficient of friction, such as on ice, this may initiate ABS control because the coefficient of friction on the driven axle is not sufficient to transmit the required brake torque. When the ABS system is active, the regenerative brake is switched off to uncouple the wheels from the driving track and safeguard the normal ABS function.

In the following, the example is based on a vehicle with electric or electro-hybrid drive (electric and combustion engine) and EHB (electro-hydraulic) brake.

The following problems are encountered in practical operations:

When the ABS control is terminated, it would be favorable to readmit the regenerative brake. However, this would shift the total braking power to the driving axle again, and permanent cycles (cyclic change-over ABS—regenerative brake—ABS—etc.) could occur. This condition is felt to be unpleasant by the driver and has adverse effects on driving stability.

DE 198 42 472 A1 discloses a vehicle brake system with friction devices and regenerative brake devices. In this arrangement, the regenerative brake is disconnected upon entry into ABS control. It stays disconnected until the braking operation is completed. This condition is detected by the fact that the driver accelerates or releases the brake during standstill.

BRIEF SUMMARY OF THE INVENTION

An object of the invention is to overcome the above-mentioned shortcomings and develop a method of the type referred to hereinabove, which permits improving the application of regenerative brake systems.

It has shown that this object can be achieved by means of the described method of coordinating the application of a regenerative and an anti-lock system, the special features involving that regenerative braking by means of the regenerative brake system upon termination of the ABS control or ABS control phase is re-admitted in dependence on the respective driving situation and/or criteria representative of the braking demand and the instantaneous coefficient of friction, in a modified form compared to the regenerative braking operation prior to entry into the ABS control mode.

Thus, the invention involves a special method that permits coordinating the use of a regenerative brake and a friction brake in such a fashion that after an ABS control operation the regenerative brake is stepwise connected again. Permanent cycles are prevented. The method purposefully gropes for the optimum of driving stability, comfort, and effective use of the regenerative brake (efficiency), and both constant and variable marginal conditions represented by the coefficient of friction and the braking demand are taken into consideration.

The sub-items 1 to 6 mentioned in the text correspond to conditions 1 to 5 listed in FIG. 1.

DETAILED DESCRIPTION OF THE PREFERRED EMBODIMENTS

Upon termination of an ABS control phase, the regenerative braking according to the method of the invention is admitted again in a modified form.

A distinction is made between the following conditions:
1. In the partial braking range (before the entry into the ABS control), the demanded braking power up to a maximum value predetermined by the generator is realized by means of the regenerative brake, any exceeding demand is realized by means of the wheel brake.
2. The regenerative brake is deactivated upon entry into the ABS control. The demanded braking power is completely realized by means of the wheel brake (in the ABS control).
3. After the end of the ABS control, a timer is waited for to run down. The regenerative brake remains disconnected (like 2.) during this time (e.g. 2 seconds). The braking demand is realized only by way of the wheel brake. The pressure in the wheel brake cylinders at the end of the ABS control is determined, converted into a brake torque and stored.
4. The regenerative brake is switched on again upon expiry of 3. However, the brake torque is limited. The limit is raised with a preset gradient starting from 0 until a defined portion (e.g. 80%) of the brake torque of the driving axle determined in 3. has been reached at the end of the ABS control. The wheel brake generates the braking power still necessary. In this condition, the brake force distribution onto the axles is not changed in comparison to the end of the ABS control. A new ABS entry is not possible with unmodified marginal conditions (coefficient of friction, braking demand).
5. Upon expiry of 4, the limit for the brake torque of the regenerative brake continues to be slowly raised until the maximum value predetermined by the generator is reached. The wheel brake generates the braking power exceeding the maximum value. In this condition, the brake force distribution to the axles is gradually shifted back to the driving axle. A new ABS entry is possible with unmodified marginal conditions (coefficient of friction, braking demand).
6. Upon expiry of 5, the regenerative brake is fully activated again. Thus, item 1 is resumed again. Item 6 corresponds to 1.

Should an entry into the ABS control take place in the conditions 3-5 prior to transition into the next cycle, there will be a transition into condition 2, and the cycle is continued from there. To avoid permanent cycles, the number of runs is limited as follows:

With a new ABS entry in state 5, a stop is made in 4. during the next run (no more transition to 5.). The limit for the brake torque of the regenerative brake hence remains on the value reached in 4.

With a new ABS entry in state 4, a stop is made in 3. during the next run (no more transition to 4.). The regenerative brake stays deactivated.

With a new ABS entry in state 3, the number of runs is not limited. There is no detrimental activation and deactivation of the regenerative brake.

Hence, the following runs are possible after an ABS entry:

a) 1-2-3-4-5-1 . . .

The cycle was run through completely. A new ABS entry is possible only by meanwhile modified marginal conditions (braking demand of the driver, coefficient of friction). Permanent cycles (multiple runs) are unlikely. Therefore, a new run is allowed.

b) 1-2-3-4-5-2-3-4

The coefficient of friction was not sufficient to completely re-start the regenerative brake. Therefore, there is a new ABS entry in 5. When the marginal conditions are unmodified, there is no new entry into ABS control from state 4. The regenerative brake stays activated with a reduced power.

c) 1-2-3-4-2-3

The coefficient of friction reduces in state 4, and a new ABS entry takes place. Subsequently, the regenerative brake stays deactivated in state 3.

d) 1-2-3-4-5-2-3-4-2-3

The coefficient of friction reduces after the run like b), and a new ABS entry takes place. Subsequently, the regenerative brake stays deactivated in state 3 like in c). Combination of b) and c).

e) 1-2-3-2-3-2 . . .

Permanent cycle without detrimental effect. The regenerative brake stays deactivated.

When the cycle is stopped as described hereinabove, a timer is started. Upon expiry of a long period of time (e.g. 30 seconds), or when the driver accelerates, or no more brake torque is demanded, the cycle is released again, that means, is continued at the point where it was halted. The period is chosen to be so long that one can assume that the driver no longer notices the correlation as disturbing. Besides, constant marginal conditions over a long period of time are very unlikely.

ADVANTAGES

During braking operations on an inhomogeneous coefficient of friction, the overall efficiency is greatly enhanced by the extended application of the regenerative brake.

Further embodiments are as follows:

1. Downhill driving over a long distance with a permanently applied wheel brake. A patch with a low coefficient-of-friction at the beginning of the course triggers ABS, thereafter follow only high coefficients of friction. Such conditions are typical on an Alpine pass. According to the prior art, the regenerative brake would be deactivated and, first of all, the total energy employed during uphill driving would be lost in charging of the traction battery and, secondly, would considerably heat up the wheel brake. According to the novel method, almost the total energy can be used for charging, and the wheel brake is relieved from load.
2. Road disturbance at the beginning of the braking operation, thereafter, high coefficients of friction. This is typical of highways with a poor roadway quality. Advantages like 1.
3. Braking on ice. The illustrated method prevents that several cycles of regenerative brake—ABS follow each other. This avoids sequences of brake force shift (front axle—rear axle) that are unfavorable for the stability of the vehicle, and comfort is enhanced by a homogeneous course of the braking operation.

Further Variants:

A multiple run of cycle a) can be prevented according to the same principle.

The described gradients and times can be variable and e.g. depend on the coefficient of friction.

The invention claimed is:

1. Method for a motor vehicle with a regenerative and an anti-lock conventional brake system (ABS) for coordinating the application of the regenerative and the anti-lock system, wherein the regenerative brake system is switched off upon entry into an ABS control phase, comprising the steps of:

identifying the termination of the ABS control phase;

determining criteria representative of a braking demand and an instantaneous coefficient of friction at the termination of the ABS control phase; and applying post ABS regenerative braking by the regenerative brake system at the termination of the ABS control phase, a value of the post ABS regenerative braking being based on the determined criteria and being in a modified form compared to a regenerative braking value prior to the entry into the ABS control phase, wherein the regenerative brake system has a maximum regenerative braking value and the post ABS regenerative braking is limited for a given period to a predetermined limit value which is less than maximum regenerative braking value.

2. Method as claimed in claim 1, wherein prior to the entry into ABS control phase, a demanded braking power is generated by the regenerative brake system until the attainment of a maximum value depending on the regenerative brake system, while the demanded braking power is generated by the conventional brake system after entry into ABS control phase.

3. Method as claimed in claim 1, wherein the step of applying post ABS regenerative braking by the regenerative brake system at the termination of the ABS control phase is delayed until after expiry of a predetermined time period after the termination of the ABS control phase, and the post ABS regenerative braking is limited to a predetermined limit value and a portion of a demanded brake torque exceeding the limit value is generated by the conventional brake system.

4. Method as claimed in claim 3, wherein the predetermined time period is in the order of approximately 1 to 3 seconds.

5. Method as claimed in claim 3, wherein the predetermined limit value is varied in dependence on a braking pressure that prevails in a corresponding wheel brake upon termination of the ABS control phase.

6. Method as claimed in claim 3, wherein the predetermined limit value is raised with a preset gradient until an allowable maximum portion of the demanded braking power is reached and the portion of the demanded brake torque exceeding the limit value is generated by the conventional brake system.

7. Method as claimed in claim 6, wherein following a predetermined waiting time after attainment of the allowable maximum portion of the demanded braking power, a rise of the allowable maximum portion with a predetermined gradient is raised until a maximum output of the regenerative brake system is reached, and the portion of the demanded brake torque exceeding the braking power of the regenerative brake system is generated by the conventional brake system.

8. Method as claimed in claim 1,
wherein in a vehicle with only one driven axle, a brake force distribution is shifted in favor of the driven axle when a demanded braking power of the driven axle can be generated by the regenerative brake system.

9. Method as claimed in claim 1,
wherein upon a new entry into an ABS control phase after a transition into phases with regenerative braking, a new transition into phases with regenerative braking is prevented.

10. Method as claimed in claim 1, wherein upon a new entry into an ABS control phase after a transition into phases with regenerative braking, a new transition into phases with regenerative braking is delayed.

11. Method as claimed in claim 1, wherein the predetermined limit value is approximately 80% or less than maximum regenerative braking value.

\* \* \* \* \*